United States Patent
Billaud

(10) Patent No.: US 10,823,838 B2
(45) Date of Patent: Nov. 3, 2020

(54) SECONDARY RADAR WITH OPTIMIZED SPATIO-TEMPORAL MANAGEMENT

(71) Applicant: THALES, Courbevoie (FR)

(72) Inventor: Philippe Billaud, Limours (FR)

(73) Assignee: THALES, Courbevoie (FR)

( * ) Notice: Subject to any disclaimer, the term of this patent is extended or adjusted under 35 U.S.C. 154(b) by 83 days.

(21) Appl. No.: 16/302,062

(22) PCT Filed: Jun. 19, 2017

(86) PCT No.: PCT/EP2017/064875
§ 371 (c)(1),
(2) Date: Nov. 15, 2018

(87) PCT Pub. No.: WO2017/220461
PCT Pub. Date: Dec. 28, 2017

(65) Prior Publication Data
US 2019/0146078 A1     May 16, 2019

(30) Foreign Application Priority Data

Jun. 21, 2016 (FR) .................................. 16 00982

(51) Int. Cl.
*G01S 13/78* (2006.01)
*G01S 13/87* (2006.01)
(Continued)

(52) U.S. Cl.
CPC .......... *G01S 13/782* (2013.01); *G01S 13/781* (2013.01); *G01S 13/872* (2013.01); *H01Q 3/24* (2013.01); *H01Q 3/26* (2013.01); *H01Q 21/205* (2013.01)

(58) Field of Classification Search
CPC .... G01S 13/781; G01S 13/782; G01S 13/872; H01Q 21/205; H01Q 3/24; H01Q 3/26
See application file for complete search history.

(56) References Cited

U.S. PATENT DOCUMENTS 5,955,990 A * 9/1999 Acoraci ................. G01S 3/023
342/156
8,703,113 B2 * 4/2014 Brandom ............... A61L 31/06
424/78.17
(Continued)

FOREIGN PATENT DOCUMENTS

EP    0 497 652 A1    8/1992
EP    2 259 085 A1    12/2010
(Continued)

OTHER PUBLICATIONS

Van Werkhoven, et al., "Evolutions in naval phased array radar at Thales Nederland B.V.", Antennas and Propagation, pp. 1-4, Apr. 12, 2010.
(Continued)

*Primary Examiner* — Timothy X Pham
(74) *Attorney, Agent, or Firm* — BakerHostetler

(57) ABSTRACT

A radar is provided which is mechanically and functionally independent of the primary radar; applies the principles of separation of emission pattern for each interrogation of any mode; of reception pattern for each reply of any mode; of assignment of the tasks which are specific thereto to distinct units. The radar includes one or more SSR/IFF interrogators (Continued)

dedicated at one and the same time to SSR surveillance and to gathering new mode S targets; and includes one or more other SSR/IFF interrogators for selective surveillance dedicated to mode S surveillance and to directed interrogations of IFF identification. The radar ensures simultaneous emission of the interrogations of the SSR/IFF interrogators in different azimuths, this simultaneous emission being enabled when the azimuthal spacing of the beams formed in emission ensures a decoupled level of jamming at the level of the transponders of the aircraft between the interrogations emitted by the respective sidelobes of the beams formed in emission.

10 Claims, 11 Drawing Sheets

(51) Int. Cl.
*H01Q 21/20* (2006.01)
*H01Q 3/26* (2006.01)
*H01Q 3/24* (2006.01)

(56) References Cited

U.S. PATENT DOCUMENTS

| | | | |
|---|---|---|---|
| 2008/0231494 A1* | 9/2008 | Galati | G01S 7/285 |
| | | | 342/37 |
| 2011/0102236 A1* | 5/2011 | Wajer | G01S 13/78 |
| | | | 342/45 |
| 2016/0033630 A1* | 2/2016 | Harvey | G01S 13/26 |
| | | | 342/43 |
| 2018/0299541 A1* | 10/2018 | Aharoni | G01S 13/78 |

FOREIGN PATENT DOCUMENTS

| | | |
|---|---|---|
| EP | 2 911 240 A1 | 8/2015 |
| EP | 2 930 531 A1 | 10/2015 |
| FR | 2 680 581 A1 | 2/1993 |
| JP | 2011-176512 A | 9/2011 |

OTHER PUBLICATIONS

Angelilli, et al., "A family of Secondary Surveillance Radars based on Conformal Antenna array geometries", 2017 IEEE Radar Conference (RadarConf), pp. 1681-1684, May 8, 2017.

* cited by examiner

SECONDARY RADAR WITH OPTIMIZED SPATIO-TEMPORAL MANAGEMENT

CROSS-REFERENCE TO RELATED APPLICATIONS

This application is a National Stage of International patent application PCT/EP2017/064875, filed on Jun. 19, 2017, which claims priority to foreign French patent application No. FR 1600982, filed on Jun. 21, 2016, the disclosures of which are incorporated by reference in their entirety.

FIELD OF THE INVENTION

The present invention relates to a secondary radar with optimized spatio-temporal management, the radar being equipped with an electronic-scanning antenna with emission of active or semi-active type.

BACKGROUND

A secondary radar with mechanically rotated antenna must in particular cope with the following simultaneous demands:
  Ensure a high rate of refreshing of the position of the target leading to decreasing the rotation period;
  Perform numerous tasks with the cooperating targets according to the various protocols (surveillance task in SSR mode and Mode S or IFF identification in Mode 4/5) at each antenna revolution, thus leading to an increase in the illumination time on each target, therefore to increasing the illumination time required per target and thus to an increase in the rotation period of the antenna thereby leading to a decline in the rate of refreshing of all the targets at one and the same time in terms of position and expected data.

These two simultaneous demands are contradictory. In practice, the management in space and time of the radiation of a secondary antenna (spatio-temporal management) is a compromise giving preference to a task (surveillance or identification in particular), according to the prime mission of the radar.

Conventionally, the antennas of a secondary radar are mechanically integral with the primary antenna.
  The sequencing of the radar breaks down into two parts:
  Periods of SSR surveillance comprising sub-periods termed "All Call" (AC) where at least three to five sub-periods are necessary in one and the same mode to extract the codes. These same periods also serve as gathering periods for the new aircraft interrogated in mode S.
  Mode S periods comprising at least three to five sub-periods termed "Roll Call" (RC) for transactions with the mode S targets.

During the AC periods, the radar emits at the start of a period an SSR interrogation and a mode S interrogation of general call and it then waits throughout the remainder of the period for the possible replies of the SSR targets and the new mode S targets to the azimuth of the antenna. The listening period necessarily corresponds to the radar's instrumented distance shy of which a new target may appear.

During the RC periods, the radar emits selective interrogations for each of the known mode S targets (already detected and tracked) which are present in the beam of the antenna at this azimuth. The targets being pre-located in terms of azimuth and distance by the radar tracking, the selective interrogations are positioned so that neither the interrogations nor the replies overlap. In contradistinction to the AC listening periods, the RC listening periods are much shorter since they are limited to the duration of the expected Mode S reply increased by the uncertainty in the target distance prediction (see FIG. 1).

In practice, whilst the reconnaissance phase constituted by the AC period is necessary, for gathering new targets and for surveillance of the SSR targets, according to the density of mode S targets in the beam, the RC periods, according to the density of mode S targets in the beam at a given azimuth, may be unused or on the contrary insufficient in terms of duration. The spatio-temporal management of the antenna beam is therefore not optimal.

This non-optimality is explained in a very simple manner: up till now, the so-called secondary radar function has been envisaged as a supplement to the so-called primary radar having to adapt a posteriori to the aerial of the primary radar. This hierarchized and successive approach of top down type imposed the principle of mechanical scanning with a focused single pattern: the architecture was deduced therefrom as well as the limitations that go therewith.

SUMMARY OF THE INVENTION

The invention starts out from the principle that another design vision is possible where the secondary radar is firstly designed specifically (bottom up approach on the best way of carrying out the requested functions) and then comes the adaptation to the primary radar. Of course, the so-called primary radar and the so-called secondary radar form a system, to be designed globally and simultaneously, and this will lead, ultimately, to combining the two approaches so as to arrive at a compromise. Hence, the purpose of the invention is not only to improve the spatio-temporal management of the secondary radar, but to introduce the most autonomous possible design of the functions termed secondary.

The search for autonomy in the design of the functions of the so-called secondary radar will entail the satisfaction of fundamental requirements of independence in relation to the sub-system consisting of the so-called primary radar. Thus, the first element of independence will be to circumvent the slaving to the mechanical rotation of the antenna of the sub-system consisting of the so-called primary radar. Thereafter additional degrees of freedom will be sought which will be obtained by separating the emission function from the reception function.

Thereafter, the application of these principles of autonomy will lead to various physical architectures of antennas associated with various emission regimes and various principles of beamforming on reception.

These system approach elements will constitute the underpinning of autonomy from which, as a consequence, it will be possible to build a system architecture which will naturally sublimate the compromise experienced by the spatio-temporal management in the conventional case by assigning entirely naturally the various tasks, which were previously contradictory, to multiple elements both for interrogations and for receptions.

Once the design principles have been established and rolled out, it is then possible to envisage realizations of application in physical classes, such as described in the paragraph hereinbelow.

The antennas are:

Either fixed electronic-scanning antennas: they can be cylindrical or consist of several fixed panels (the market is veering toward a number of 4 to 6 fixed panels);

Or rotating antennas with one panel.

At the microwave-frequency level, electronic-scanning antennas can be classed according to 3 major types:

Either with emission of passive type: emission and reception are centralized outside of the antenna itself (conventionally as is the case for rotating antennas);

Or with emission of semi-active type: emission is centralized outside of the antenna and reception is distributed in the antenna itself;

Or with emission of active type: emission and reception are distributed in the antenna.

An electronic-scanning antenna with emission of passive type forms the beam and steers the energy in emission and reception in a direction in space from or toward an SSR/IFF interrogator. Once the SSR or IFF tasks have been performed in this direction, the beam is switched into another direction. By construction, an electronic-scanning antenna with emission of passive type remains single-beam. Accordingly, at a given instant, it can emit and receive in only a single direction.

Therefore, electronic-scanning antennas with emission of passive type are confronted with the same compromise as mechanically rotated antennas between refresh rate and illumination time per target.

In the case of an electronic-scanning antenna with emission of active type, an emission and reception function is associated with each radiating element so as to make it possible to emit SSR or IFF interrogations simultaneously for example in two different directions. When the reception antenna employs computational beamforming (CBF), it is then possible to receive simultaneously in all directions the replies of the targets to the previously emitted interrogations, by analog reception beamforming (ABF) or computational beamforming (CBF).

It is therefore understood that, to circumvent completely the compromise between refresh rate and illumination time per target with which mechanically rotated antennas and, more generally, electronic-scanning antennas with identical emission and reception patterns are confronted, it is therefore necessary to have on the one hand distributed emission with emission radiating elements and on the other hand, reception radiating elements with beamforming on reception. By virtue of this dual condition, the spatio-temporal management can be freed from the constraint of azimuthal pointing of the beam and thus focus on the temporal dimension alone.

It then becomes conceivable to improve the spatio-temporal management (STM), by making it possible in particular to distinguish:

The surveillance tasks on targets that are not distance-manageable, such as non-individually-addressable SSR or IFF targets or new Mode S targets;

The Mode S surveillance and identification tasks pre-located in terms of distance and azimuth.

These various tasks being assigned to different interrogators.

For this purpose, the subject of the invention is a secondary radar equipped with an electronic-scanning antenna with active or semi-active emission regime, covering space azimuthally over 360°, characterized in that said radar:

is mechanically and functionally independent of the primary radar;

applies the principles of separation
of emission pattern for each interrogation of any mode;
of reception pattern for each reply of any mode;
of assignment of the tasks which are specific thereto to distinct units;

comprises one or more SSR/IFF interrogators dedicated at one and the same time to SSR or IFF surveillance and to gathering new mode S targets;

furthermore comprises one or more other SSR/IFF interrogators for selective surveillance dedicated to mode S surveillance and to directed interrogations of IFF identification;

ensures simultaneous emission of the interrogations of said SSR/IFF interrogators in different azimuths, said simultaneous emission being enabled when the azimuthal spacing of the beams formed in emission ensures a decoupled level of jamming at the level of the transponders of the aircraft between the interrogations emitted by the respective sidelobes of the beams formed in emission;

ensures simultaneous reception of the replies to said interrogators in different azimuths, said simultaneous reception being enabled when the azimuthal spacing of the beams formed in reception ensures a decoupled level of jamming at the level of the radar between the replies expected by the respective sidelobes of the beams formed in reception;

instructs the interrogators to ensure amongst themselves the temporal separation of the reception periods when the spacing of the beams in azimuth is insufficient to guarantee either correct interpretation of the interrogation by the transponder or correct detection of the reply by the radar.

In a particular embodiment, one of the interrogators dedicated at one and the same time to SSR surveillance and to gathering new mode S targets, informs said interrogators, dedicated to mode S surveillance and to directed interrogations, of the detection of a new target, said new target then being managed by said interrogators, at least one of said interrogators controlling the pointing of its emission beam and then subsequently of its reception beam in the direction of said target provided that the previously mentioned simultaneous enabling of emission and reception is acquired.

An operator defines for example for each target the refresh rate that he desires for the IFF identification/surveillance whatever the azimuth of the detected target and in a manner decorrelated from reconnaissance.

An operator defines for example multi-mode operation as follows:

during reconnaissance, operation being non-selective of type
surveillance of aircraft of SSR aircraft
surveillance of military aircraft in IFF
acquisition of new Mode S aircraft during surveillance, operation being selective/designated of type
selective interrogations/replies of Mode S Surveillance
selective interrogations/replies of Mode S Data Link with the same aircraft as in Mode S Surveillance directed interrogations of IFF identification (modes 4/5) on external request for a pre-detected aircraft the operator also defining:

for each target, independently, the refresh rate that he desires for the surveillance in Mode S/Mode S data link/IFF identification whatever the azimuth of the detected target and in a manner decorrelated from reconnaissance;

the priorities relating to the modes selected in case of conflict on the resource for focusing the beam in azimuth in emission or in reception.

To speed up the SSR surveillance, said radar can comprise at least one other SSR/IFF interrogator of SSR surveillance, independent of said first interrogator, having an associated beam pointing in a direction other than that of the beam associated with said first interrogator (in the opposite direction for another SSR/IFF interrogator, in quadrature for three other SSR/IFF interrogators).

When the emission regime is of active type, a supervisor device is for example provided to enable simultaneous interrogations in azimuths that are sufficiently distinct, having regard to the beam formed, to avoid the blocking of the transponders and in that, when the emission regime is of semi-active type, the common emission resource can be allocated by priority to SSR/IFF interrogator No. 1, and then to the other interrogators.

Said antenna is for example cylindrical.

Said antenna consists for example of panels with each of which is associated at least one SSR/IFF interrogator.

It can be fixed or rotating.

BRIEF DESCRIPTION OF THE DRAWINGS

Other characteristics and advantages of the invention will become apparent with the aid of the description which follows given in relation to appended drawings which represent.

DETAILED DESCRIPTION

Although the figures take as example the electronic-scanning antenna with semi-active emission, the principles of the invention are still more applicable to the electronic-scanning antenna with active emission since it allows moreover simultaneous emissions.

Figure 1:
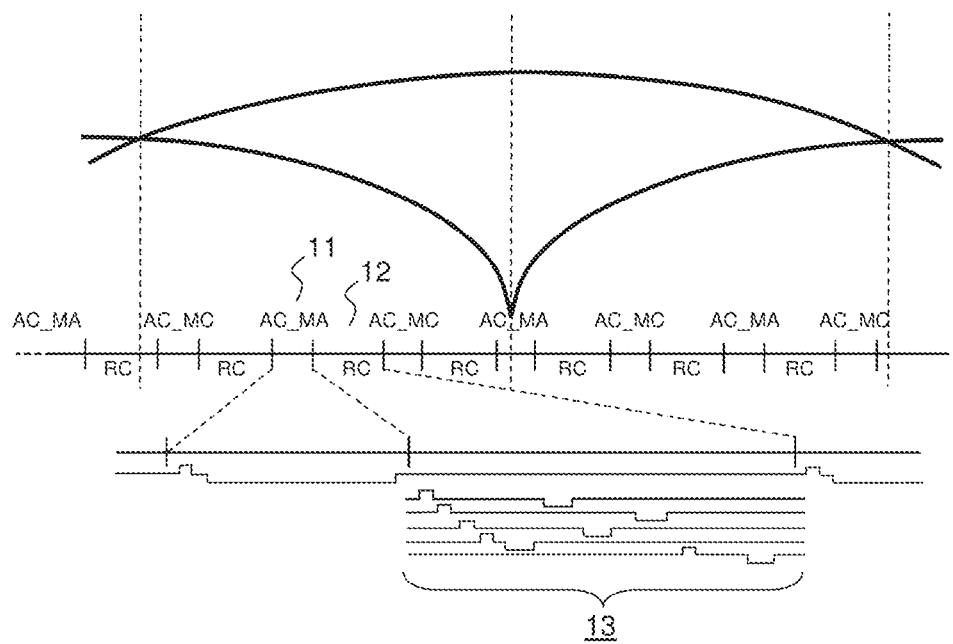
FIG. 1, sequences of SSR surveillance and of selective interrogations in a mechanically rotated radar.

FIG. 1 presents the conventional sequencing of an SSR/IFF interrogator associated with mechanical rotation. Hereinafter, SSR/IFF interrogators will be mentioned, it being immaterial whether they are of the SSR and/or IFF type.

The STM creates a temporal succession of AC periods 11 and RC periods 12 at the azimuth at which the antenna points. The STM selectively interrogates 13 in the RC period the mode S targets that it thinks are present at this azimuth in the beam of the antenna.

Therefore, when, in its azimuthal progressive advance, the beam no longer illuminates the Mode S target the latter will have to wait an antenna revolution in order to continue the transactions in Mode S.

Figure 2:
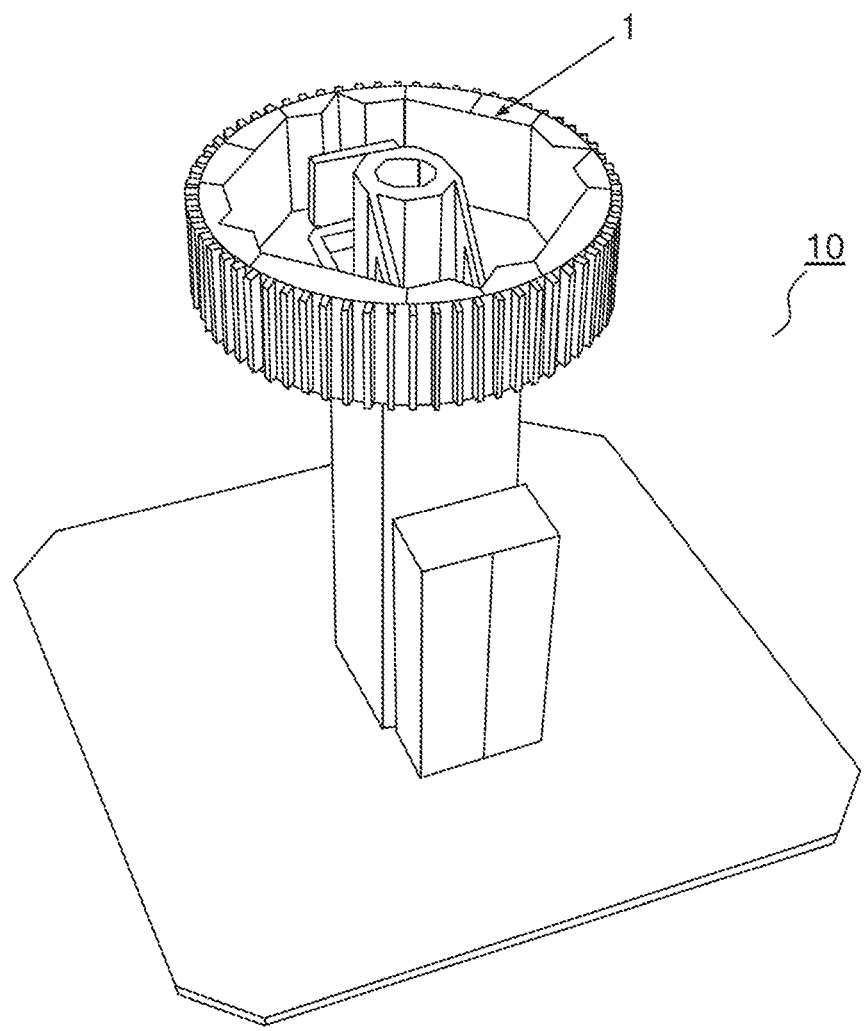
FIG. 2, through a perspective view, an exemplary cylindrical secondary electronic-scanning antenna.

FIG. 2 presents through a perspective view an exemplary cylindrical secondary electronic-scanning antenna 1 fitted to a radar 10. The invention could also apply to an electronic antenna composed of plane panels, for example four in number, covering space azimuthally over 360°.

Figure 3:
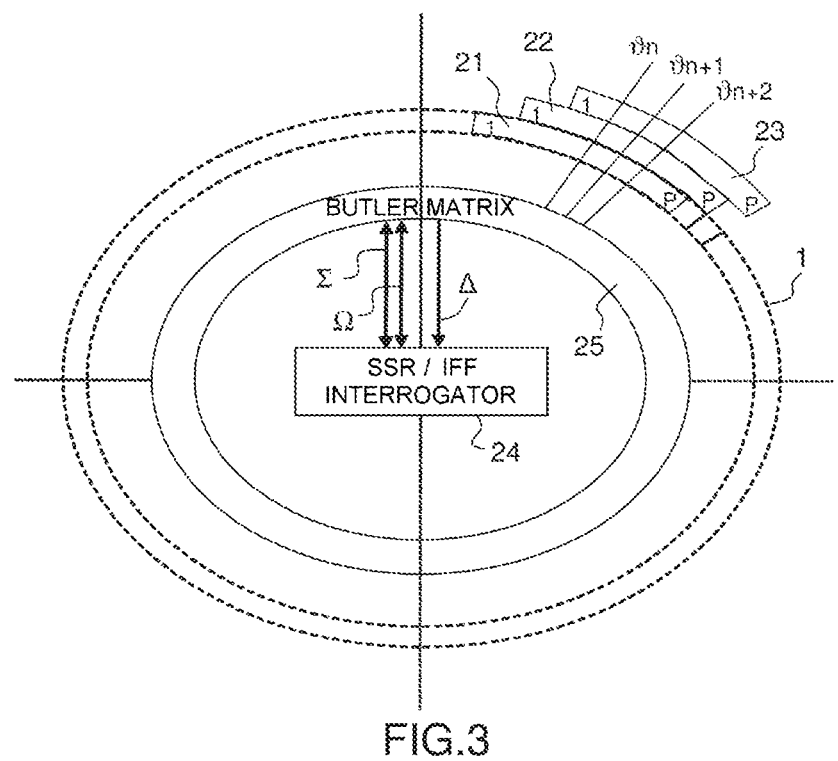
FIG. 3, an illustration of the manner of operation of a passive cylindrical electronic-scanning antenna.

FIG. 3 illustrates the manner of operation of an electronic antenna with emission of passive type. In this case, a centralized single power amplifier formulates the interrogation. A centralized switching matrix 25, for example a Butler matrix, makes it possible to control the position of the emission power on the outline of the antenna by means of a phase law applied to the input of the matrix. Control in reception is also centralized via the Butler matrix. The latter is interfaced with an SSR/IFF interrogator 24 producing the SSR and Mode S interrogations and decoding the replies returned.

The elementary manner of operation of a cylindrical fixed electronic-scanning antenna with emission of passive type consists in simulating a mechanical antenna rotation so as to distribute the illumination time homogeneously over the whole of the coverage.

At a given instant, the cylindrical antenna uses P radiating elements 21 to form the beam in a given azimuth $\theta_n$. Once the SSR or Mode S surveillance tasks have been performed, the antenna pointer is shifted by N radiating elements and the antenna beam is reformed in another azimuth $\theta_{n+1}$ on the basis of another set 22 of P elements, shifted with respect to the first set 21. And so on and so forth with another set 23 of P elements so as to form a beam in another direction $\theta_{n+2}$.

Figure 4:
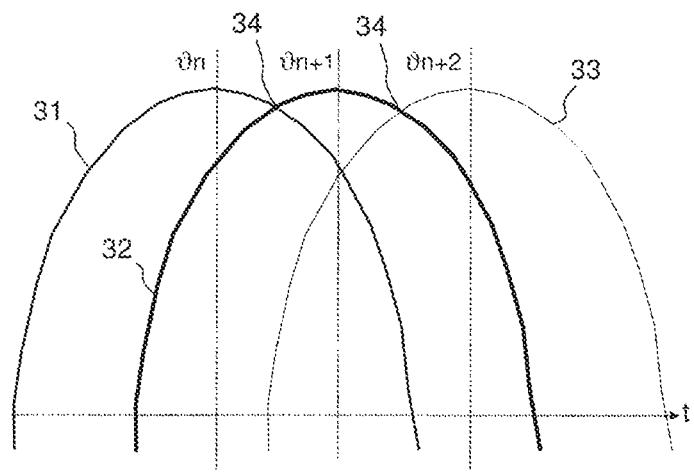
FIG. 4, a representation of antenna gains for three successive directions of pointing.

FIG. 4 presents the antenna gains 31, 32, 33 as a function of time for three successive azimuth positions $\theta_n$, $\theta_{n+1}$, $\theta_{n+2}$. Thus, in each beam position, the STM executes a sequencing of the type of that of FIG. 1. Two types of beam management are possible:

either the beam advances at constant azimuthal rate, just as for an mechanically rotated antenna, therefore guaranteeing an identical refresh rate in all the azimuths but not guaranteeing the execution of all the mode S transactions for lack of time;

or the beam is maintained at a given azimuth for the time required to position the number of AC and RC periods necessary to ensure the SSR and Mode S surveillance or for a Mode 4 or Mode 5 IFF identification but then the refresh rate is no longer constant and it depends completely on the number of aircraft and the transactions which are associated therewith.

The sequencing of the electronic antenna with emission of passive type is thus the same as that of a mechanical antenna. Indeed, the switching of the antenna beam from one azimuthal position to another requires the switching of power elements. At each switching the RF transmission is interrupted. It is therefore more efficient to make all the RF transactions at a given azimuth before changing the positioning of the beam.

With such an antenna, the radar remains a compromise between:
- The simulated rotation speed (refresh rate) of the antenna;
- The radar's range, guaranteed by the antenna gain at the level of the gain crossovers 34 (speed of displacement of the beam in azimuth);
- The maximum number of aircraft per sector that can be managed in mode S;
- The number of mode S transaction per aircraft.

Figure 5:
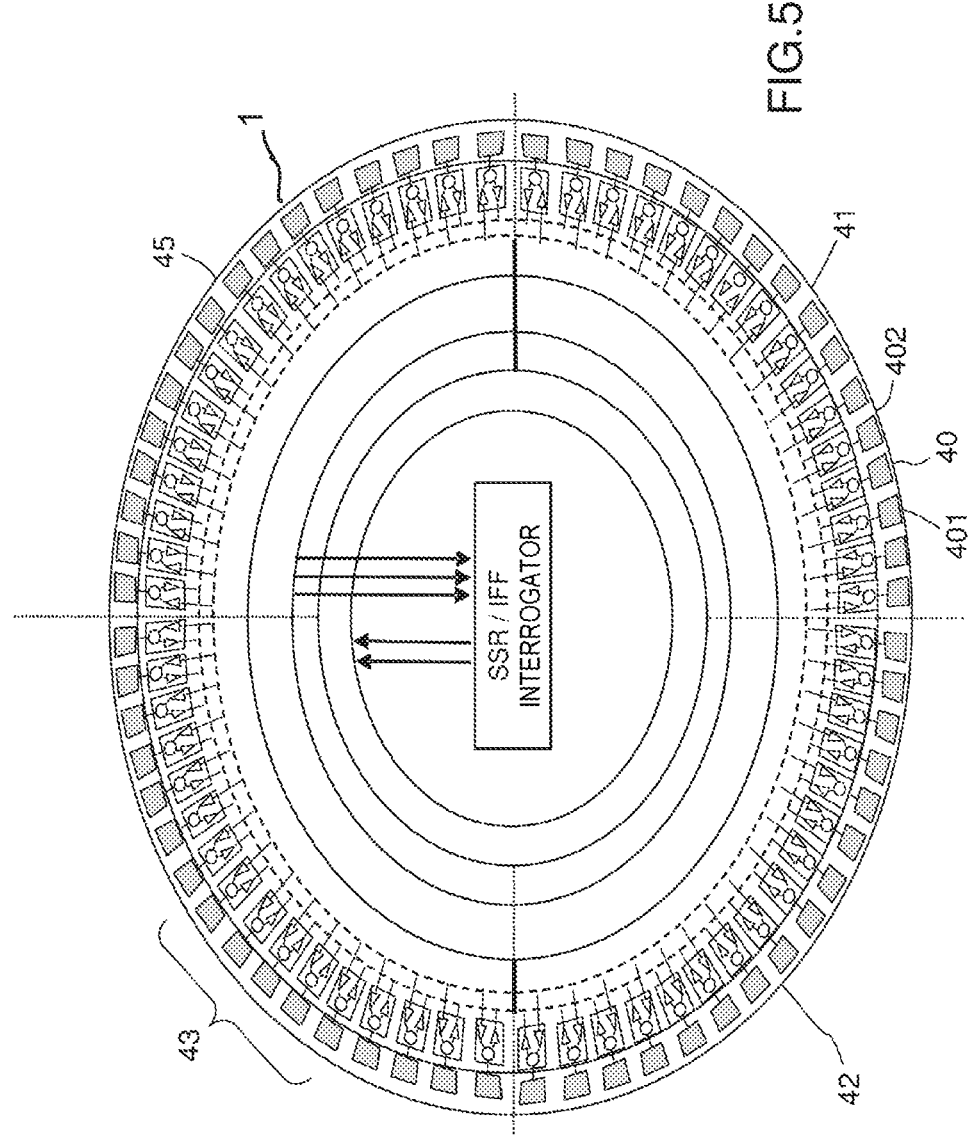
FIG. 5, an illustration of the manner of operation of an active cylindrical electronic-scanning antenna.

FIG. 5 illustrates the principle of an electronic-scanning antenna with emission of active type in the case of a cylindrical antenna which associates with each radiating element 40:
- An emission function 401 which can be adjusted in power level, to reduce the level of the sidelobes and adapt the radiated power to the distance of the sighted target, and in phase, to ensure the squinting of the beam;
- A reception function 402.

This type of antenna with emission of active type therefore makes it possible simultaneously at various azimuths to:
- In emission 44, transmit interrogations via a transmission bus 41, in directions which are sufficiently different that the first interrogation is not perceived by the target for which it is not intended so as to avoid its blocking, that is to say are spaced fairly far apart in azimuth as a function of the sidelobes of the beam thus formed using P radiating elements 43, the emission beam being formed by computational beamforming 44 (CBF);
- In reception 45, receive replies, via a reception bus 42, simultaneously on several other azimuths, subsequent to previously transmitted interrogations, by utilizing through beamforming the set of radiating elements of the cylindrical fixed antenna.

An electronic-scanning antenna with emission of active type therefore makes it possible to completely utilize the characteristics of the mode S in the sense that the selectivity of the interrogations as of the replies makes it possible to select a target from among several at a given azimuth.

Another type of electronic-scanning antenna is the antenna with emission of semi-active type, which represents a simplified version of an antenna with emission of active type. In particular:
- It comprises a centralized emission function for performing beamforming and for switching to P radiating elements;
- A reception function is associated with each radiating element.

An electronic-scanning antenna with emission of semi-active type therefore makes it possible simultaneously to:
- Transmit one interrogation in a single azimuthal direction;
- Receive several replies, via the reception bus 42, simultaneously on several other azimuths, subsequent to interrogations transmitted previously by utilizing at the same instants the set of radiating elements 40 of the antenna by forming various beams.

Like the antenna with emission of passive type, the antenna with emission of semi-active type allows emission only in a single given azimuth and the switching of emission from one azimuth to another is fairly slow since it requires the switching of strong signals.

Nonetheless, both for the antenna with emission of active type and for the antenna with emission of semi-active type, separation of the emission and reception beams already offers the possibility of a noticeable improvement in the spatio-temporal management of the IFF function.

Figure 6:
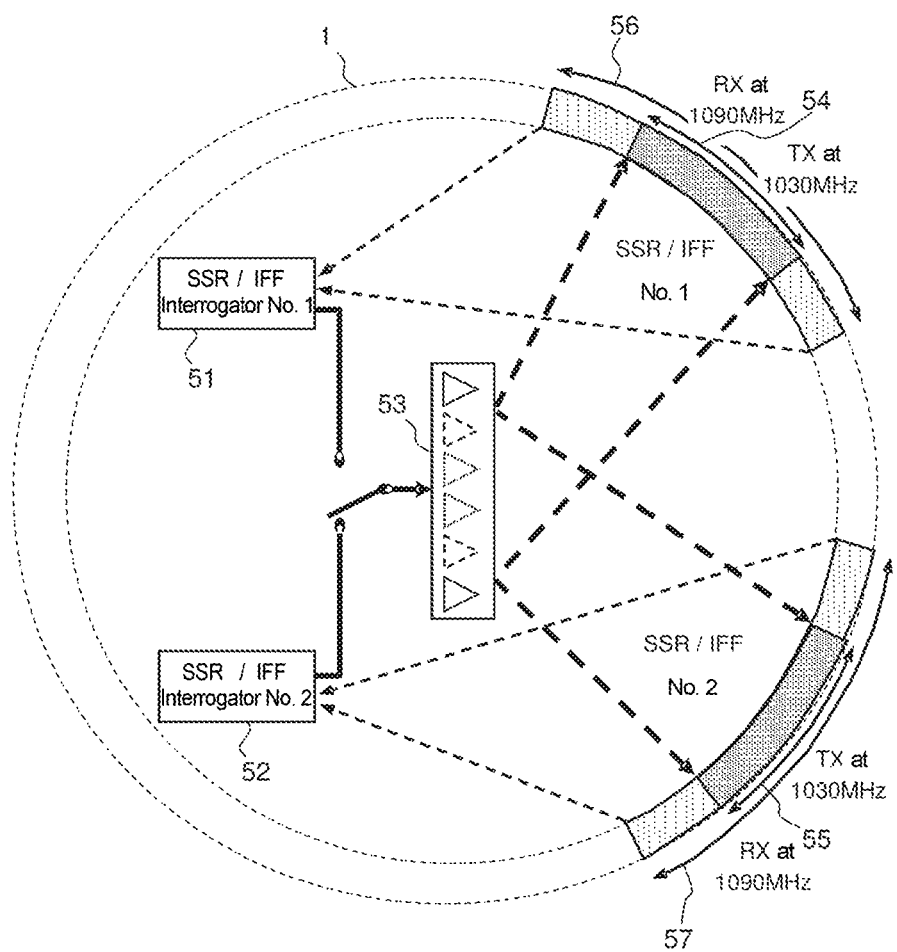
FIG. 6, an illustration of the principle of spatio-temporal management of the antenna beams in a radar with semi-active electronic antenna according to the invention.

FIG. 6 illustrates the principle of the invention which proposes a new spatio-temporal management (STM), different from that of mechanically rotated or electronic-scanning antennas with emission of non-active type, in the sense that it distinguishes:
- The tasks of surveillance on targets that are not distance-manageable (SSR and IFF surveillance, targets that are not addressable selectively like mode S targets, or new mode S targets);
- Tasks of surveillance (mode S) and IFF identification (designation on primary track) which are pre-located in terms of distance and azimuth.

FIG. 6 presents an exemplary embodiment, in the case of an electronic antenna with emission of semi-active type, based on two SSR/IFF interrogators 51, 52 of medium power, linked to a device 53 with power amplifier associated with a beamforming and the steering of the beam toward the P radiating elements 54, 55, the device 53 switching onto one or the other of the SSR/IFF interrogators. In this configuration:
- The first interrogator (SSR/IFF interrogator No. 1) is dedicated to SSR, IFF surveillance and to gathering the new mode S targets;
- The second interrogator (SSR/IFF interrogator No. 2) can be toggled from a surveillance opposite to IFF No. 1 (as background task in the absence of the following tasks) to:
  - Either IFF identifications according to a window dependent on the position of the target defined by the primary radar;
  - Or selective mode S transactions.

Reception being permanent over 360°, the CBF makes it possible to form beams in different azimuthal directions 56, 57 simultaneously and thus to allow simultaneous listening in several azimuths to the replies of any mode.

In the example of FIG. 6, IFF No. 1 ensures the SSR surveillance at given azimuth, whilst IFF No. 2 simultaneously ensures a mode S surveillance at another azimuth.

Figure 7:
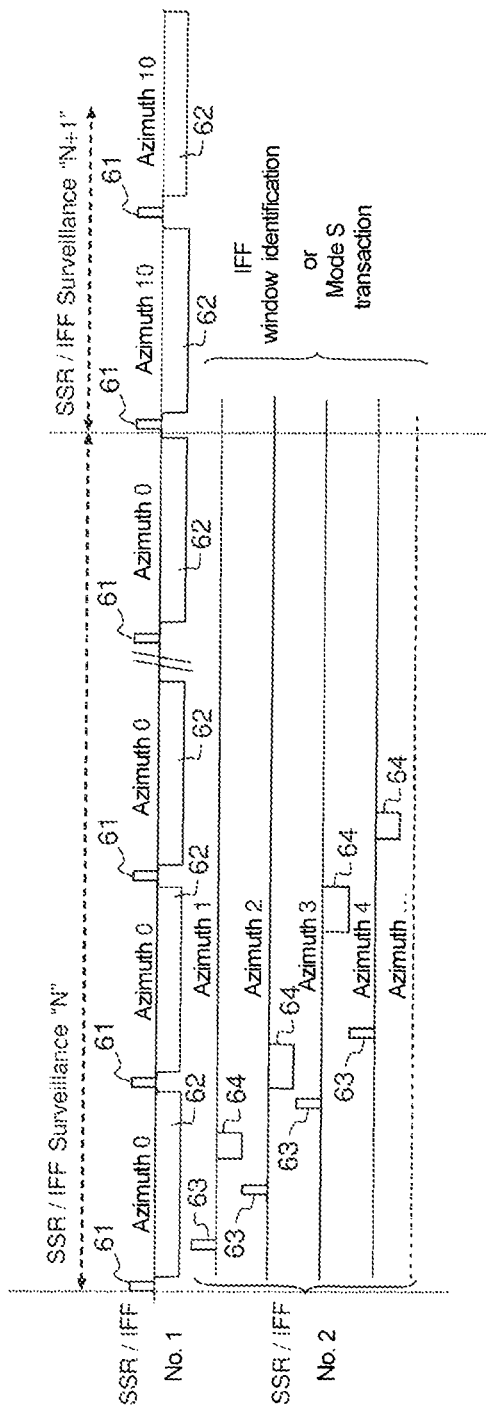
FIG. 7, sequences of SSR surveillance and of selective interrogations in a radar according to the invention comprising two SSR/IFF interrogators.

FIG. 7 illustrates an example of STM ensuring a succession of the surveillance sequences with the method according to the invention, more particularly SSR surveillance No. N followed by SSR surveillance No. N+1. This example corresponds to the case of FIG. 6, based on the use of two SSR/IFF interrogators. FIG. 7 presents the sequence of interrogation periods 61, 63 and periods dedicated to the replies 62, 64 in given azimuths where the latter are tagged by a serial number 1, 2, 3, 4 corresponding to the predicted azimuth of the referenced targets.

In SSR surveillance No. N:
- SSR/IFF interrogator No. 1 ensures, at the azimuth 0, azimuthal surveillance in the conventional modes, SSR, IFF and the gathering of the new mode S targets in particular;
- SSR/IFF interrogator No. 2 can:
  - either ensure, in the other azimuths 1, 2, 3, 4 . . . , the management of the tracks referenced in terms of azimuth distance, IFF identification or mode S surveillance, almost without latency;

or in their absence, ensure, in the azimuth opposite to the azimuth 0 (+180°), an opposite azimuthal surveillance of IFF No. 1 for the conventional modes, SSR, IFF and thus acquire new targets more rapidly.

For IFF No. 1, given that the targets are unknown, the listening periods 62, dedicated to the replies, are long and moreover dependent on the instrumented distance. The duration of a surveillance at a given azimuth depends on the number of SSR modes to be interrogated and to be decoded. All the azimuths must be covered one after the other. After SSR surveillance No. N, the SSR/IFF interrogator No. 1 points at the following azimuth, the azimuth 10 in the example of FIG. 6, in a manner analogous to the sequencing described in FIG. 4.

The choice of a single second interrogator, IFF No. 2, to manage the transactions at various azimuths makes it necessary nonetheless to ensure non-overlapping of the replies 64, to allow successful decoding of the reply, as shown by the sequences of FIG. 7.

Figure 8:
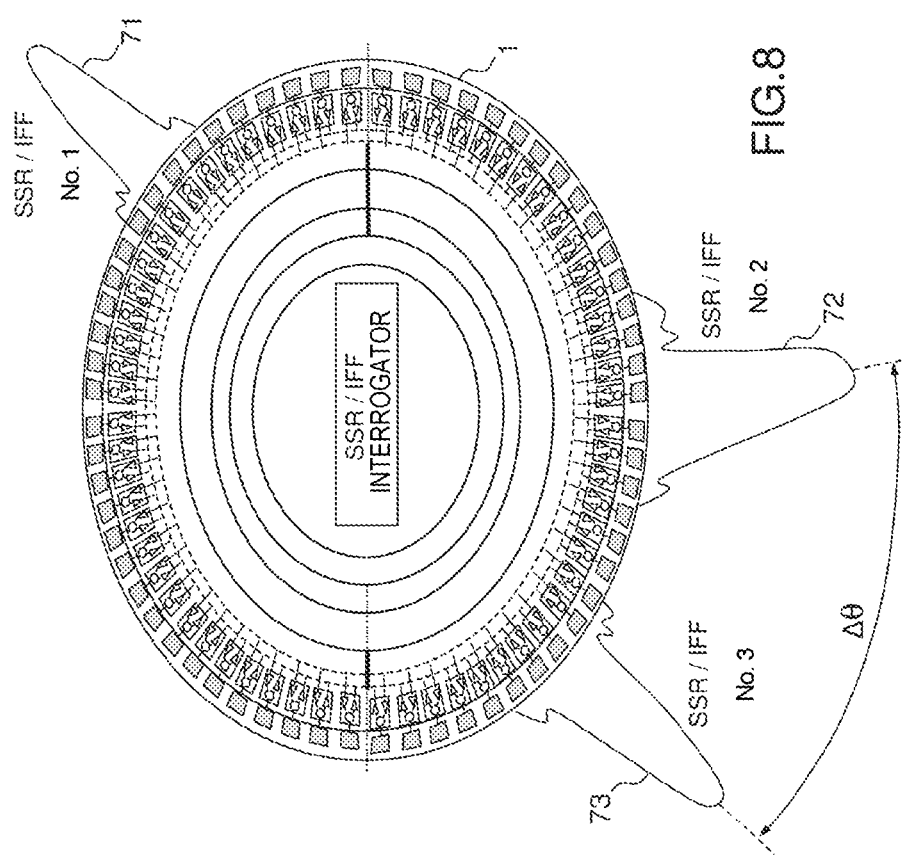
FIG. 8, an illustration of the utilization of the antenna beams in a radar according to the invention comprising three SSR/IFF interrogators.

FIG. 8 presents an implementation of the invention which is more elaborate where a third SSR/IFF interrogator, IFF No. 3, is added. This figure presents at the same instant the three antenna beams 71, 72, 73 on the outline of the antenna, corresponding to the three SSR/IFF interrogators No. 1, IFF No. 2 and IFF No. 3.

This configuration makes it possible in particular to temporally overlap interrogations or replies at different azimuths, to ensure azimuthal separation, according to the antenna beam formed with the P elements, and therefore to ensure, with success, either the decoding of the two simultaneous interrogations by the transponders or the decoding of the two simultaneous replies respectively by IFF No. 2 and IFF No. 3. This is applicable even in the case of an electronic-scanning antenna with emission of semi-active type, a single emission beam can be created at a given instant whilst several simultaneous reception beams are possible.

Figure 9:
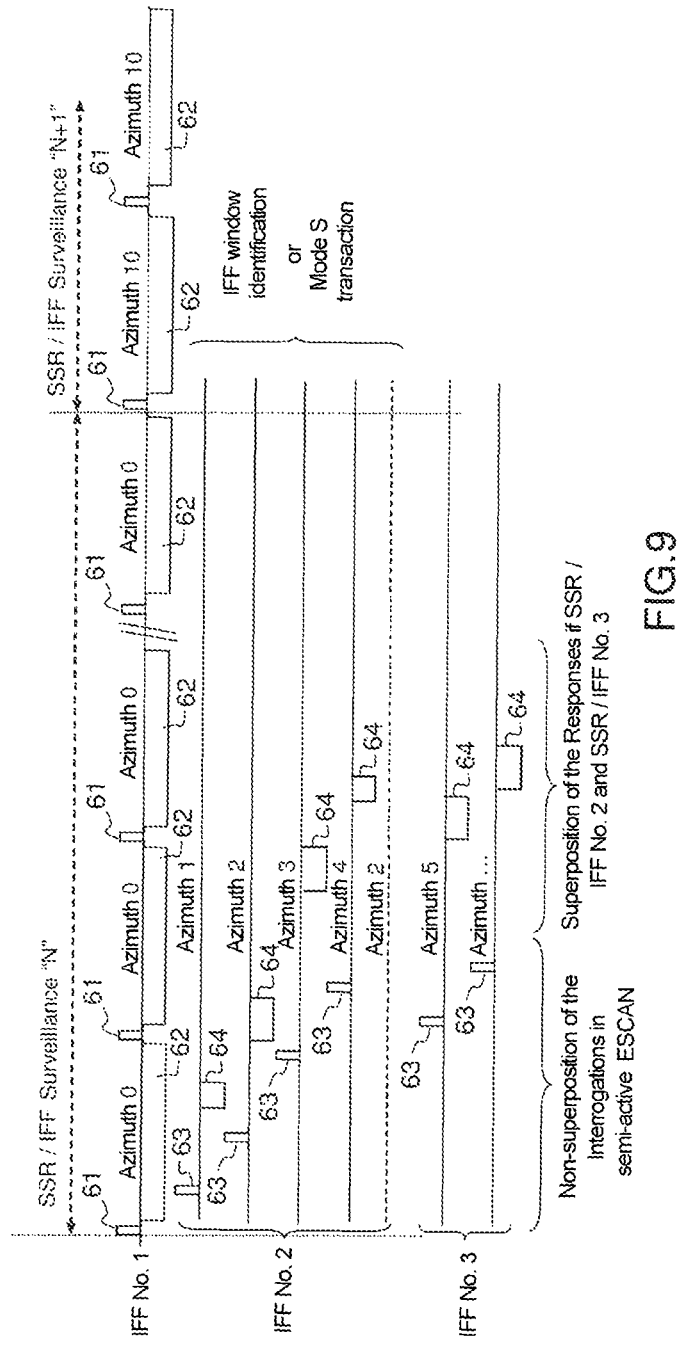
FIG. 9, sequences of SSR surveillance and of selective interrogations in a radar according to the invention comprising three SSR/IFF interrogators.

FIG. 9 presents the successions of interrogation and of listening periods corresponding to a configuration with three SSR/IFF interrogators, as illustrated by FIG. 8. In this representation, the notations by serial numbers, azimuth 0 or 10 and azimuth 1, 2, 3 . . . , signify that these azimuths are spaced sufficiently far apart, with distinct main lobes, to allow simultaneous reception of signals of various targets without causing overlaps of the replies, which would give rise to non-detections by garbling. More precisely, with reference to FIG. 8, an angle Δθ between two beams 72, 73 must remain beyond a minimum value to avoid overlaps. Conventionally, a detection is obtained when the signal to jammer ratio is greater than 10 dB. Therefore, the STM defines the angle Δθ by computing the jamming level received by a sidelobe of the adjacent beam and the target sighted by this beam. Likewise, with reference to FIG. 4, the maximum deviation between two reconnaissance beams, azimuth 0 and azimuth 10 in the example of FIG. 9, is defined by the expected minimum gain corresponding to the crossing 34 of their radiation patterns. The inter-azimuth reconnaissance beam gap therefore depends on the beam and on the desired range. It is thus possible to discretize azimuthal space and point at a series of azimuths to cover the whole space, during reconnaissance and simultaneously during directed transactions almost independently in interrogations and in replies.

Reconnaissance ever guaranteed at constant azimuthal rate is thus decorrelated from the designated Mode S surveillance/IFF identification, these now being performed on a temporal base alone, at one and the same time independently per aircraft and decorrelated from reconnaissance.

Reconnaissance makes it possible to locate the targets, through SSR/IFF interrogator No. 1. A target having been located, the transactions can then be made by the other two interrogators, and more generally on the other interrogators in a configuration comprising more than three interrogators.

The invention thus makes it possible to manage over time and in space the displacement of the beams 71, 72, 73 and the triggering of the interrogations and of the replies and thus to optimize the various tasks as a function of the time available, by altering the agility of the beams which is afforded by an electronic antenna with emission of active or semi-active type.

Accordingly, a manager of the antenna patterns comprises a temporally managed interface making it possible to define the start time, the end time of the beam in a given azimuth for each interrogator.

The interrogations 61, 63 emitted by the emission beam cannot be superposed in the case of an emission of semi-active type. On the other hand, the replies 62, 64 can be superposed over time owing to the fact that several reception beams can be produced simultaneously. It is thus possible to carry out several SSR/IFF receptions in parallel with a single antenna, thereby simplifying the constraints of the STM. Indeed, before, it was necessary to guarantee total non-overlapping of the replies since the latter were in the same azimuth.

During application of the method according to the invention, an SSR/IFF radar in a version with electronic antenna with emission of semi-active or active type can therefore achieve optimal spatio-temporal management, in particular:

the refresh rate of the SSR or IFF surveillance can be at its optimum, considering that it is performed by a single interrogator, SSR/IFF interrogator No. 1, owing to the fact that this task 61, 62 has priority and is now decorrelated from the mode S surveillance or the directed interrogations (DI) of IFF identification, it being possible to envisage speeding it up by adding another interrogator dedicated to SSR or IFF surveillance, denoted IFF No. 1 bis, managing an opposite azimuth to SSR/IFF interrogator No. 1;

the refresh rate of the mode S surveillance, including the associated mode S data link, or of the directed interrogations (DI) of IFF identification can also be at its optimum since it is possible in all directions, while avoiding those undergoing SSR/IFF surveillance to limit the pollution, according to functional requirements.

Figure 10:
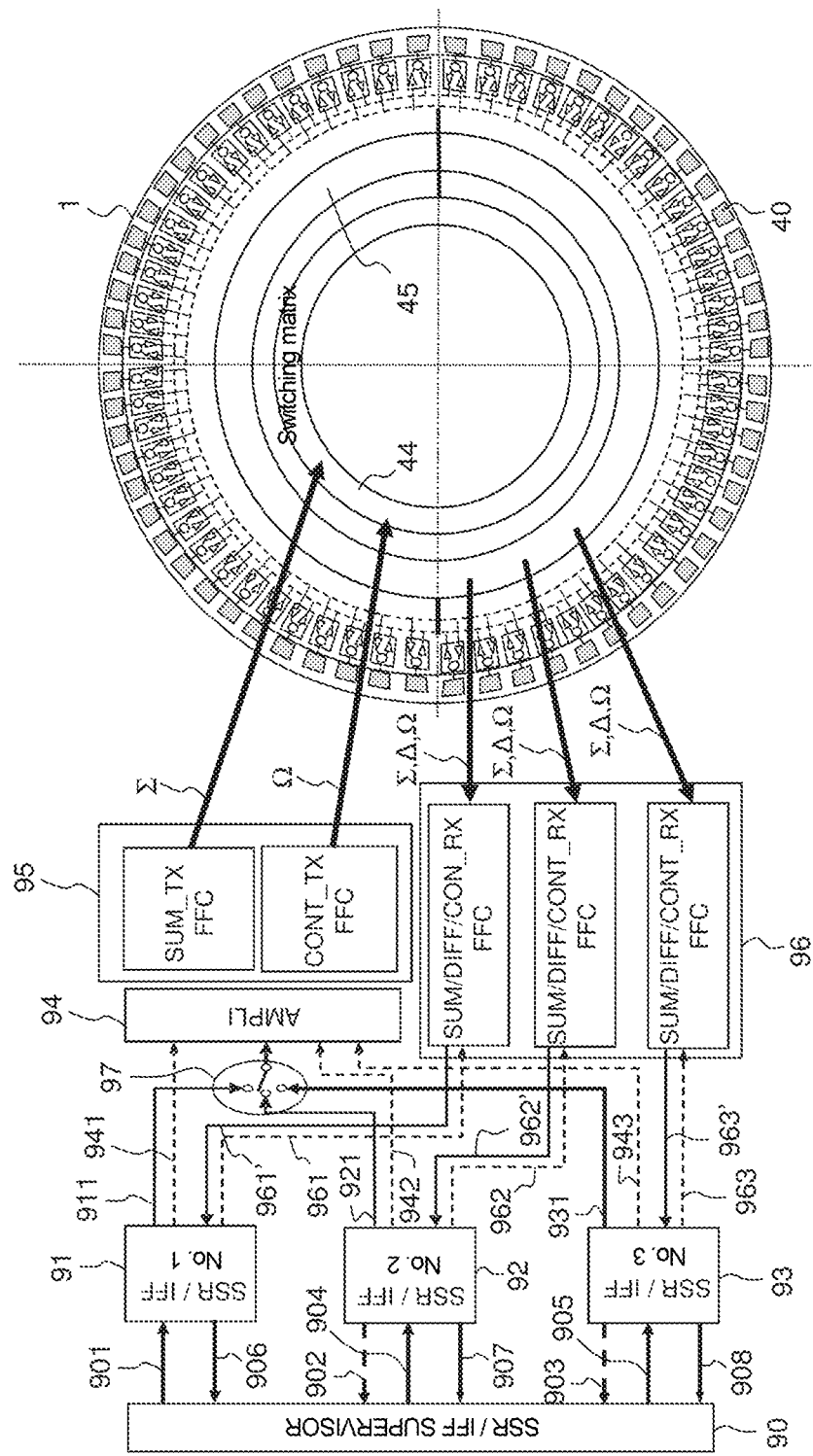
FIG. 10, an exemplary implantation of the spatio-temporal management in a radar with electronic antenna with semi-active emission according to the invention.

FIG. 10 illustrates a possible implementation of spatio-temporal management in a radar according to the invention, equipped with an electronic-scanning antenna with emission of active or semi-active type. In this example, three SSR/IFF interrogators 91, 92, 93 are used. It is of course possible to provide for realizations with a greater number of interrogators (from 2 to N). A first interrogator 91, SSR/IFF interrogator No. 1, is assigned to the SSR or IFF surveillance, the other interrogators 92, 93, SSR/IFF interrogators No. 2 and SSR/IFF interrogator No. 3, are mainly assigned to the transaction tasks (mode S surveillance, including the associated mode S data link, and DI for IFF identification).

This example is also presented with a cylindrical electronic antenna 1 with emission of semi-active type. The antenna is cylindrical, but other types of configurations are possible provided that the antenna covers 360°. The antenna can also consist of several panels of radiating elements, four for example as presented in FIG. 11.

A supervisor 90 ensures the coordination of the SSR/IFF interrogators. In particular, it defines 901 the IFF tasks of surveillance of interrogator No. 1 allowing an operator to define according to the azimuth the nature of the surveillance tasks to be done. It thus defines the IFF modes, the reconnaissance IFF identification in a given azimuthal sector, the power and the sensitivity of reconnaissance in particular.

As a function of the availabilities 902, 903 of SSR/IFF interrogators No. 2 and No. 3, the supervisor distributes 904, 905:
- the mode S selective interrogations with the mode S transactions associated with each target, either periodically, or subsequent to external requests;
- the directed interrogations for the IFF identification according to requests external to the IFF radar;

these interrogations having to be performed according to the rate of refreshing of the targets that is desired by the operator for each of the detected targets.

Hence, the service rendered by the IFF radar is operated on a temporal basis that the operator defines for each target according to the level of interest that he ascribes to it.

Likewise, a new mode S target detected during surveillance 906 is now very rapidly confirmed by a selective interrogation (and no longer 2 revolutions later as with the mechanical antenna), thus delivering to the operator right from its detection all the mode S information requested 907, 908 in the guise of mode S targets, in particular the identification of a flight or else the capacity of the data transmission links. Moreover, this is carried out with a much higher success rate in the placement of the interrogations than with a rotating mechanical antenna, since it removes the randomness of displacement of the target during the minimum 2 revolutions between the $1^{st}$ detection and the $1^{st}$ selective interrogation of a mechanical antenna.

Each of the SSR/IFF interrogators 91, 92, 93 requests access to an emission resource by specifying the emission azimuth 941, 942, 943 and by providing the sum and control signals 911, 921, 931 to be emitted. For this purpose, the antenna 1 being one with emission of semi-active type, a centralized amplifier 94 provides the power necessary for emission. The low-level sum and control signals are transmitted to the amplifier via a switch 97, steering one or the other of the interrogators toward the amplifier. The signals are amplified and the sum beam and control beam Ω are computed (CBF) by beamforming means 95. At a given instant the signals which are amplified and computed by the beamforming means 95 are transmitted, via a switching matrix 44, to the groups of Q radiating elements, to form a beam pointing in the requested azimuth 941, 942, 943.

In reception, the beams assigned respectively to interrogator No. 1, to interrogator No. 2 and to interrogator No. 3 can be formed in parallel. Each interrogator therefore independently requests the formation in parallel of a reception beam, on the basis of P radiating elements, for the sum signals Σ, the difference signals Δ and the control signals Ω in its requested azimuth 961, 962, 963. The reception beams are formed by computation (CBF) by reception and processing means 96. A CBF computing the beams Σ, Δ, Ω is assigned to each interrogator. The signals 961', 962', 963' arising from the CBFs are transmitted to their respective interrogators.

The sequences of reconnaissance and of interrogations produced by the system of FIG. 10 are for example the sequences illustrated by FIG. 9. In particular, the radar according to the invention:

- ensures simultaneous emission (61, 63) of the interrogations of the interrogators (91, 92, 93) in different azimuths (71, 72, 73), simultaneous emission being enabled when the azimuthal spacing of the beams formed in emission ensures a decoupled level of jamming, conventionally of at least 10 dB, at the level of the transponders between the interrogations received by the respective sidelobes of three beams formed in emission.
- ensures simultaneous reception (62, 64) of the replies to said interrogators (91, 92, 93) in different azimuths (71, 72, 73), simultaneous reception being enabled when the azimuthal spacing of the beams formed in reception ensures a conventionally decoupled level of at least 10 dB of jamming at the level of the radar between the replies expected by the respective sidelobes of the three beams formed in reception.

Advantageously, the invention makes it possible to use several parts of the antenna simultaneously and therefore to ensure greater surveillance at a given instant with several targets at different azimuths simultaneously, and not one after the other as in certain solutions of the prior art.

Figure 11:
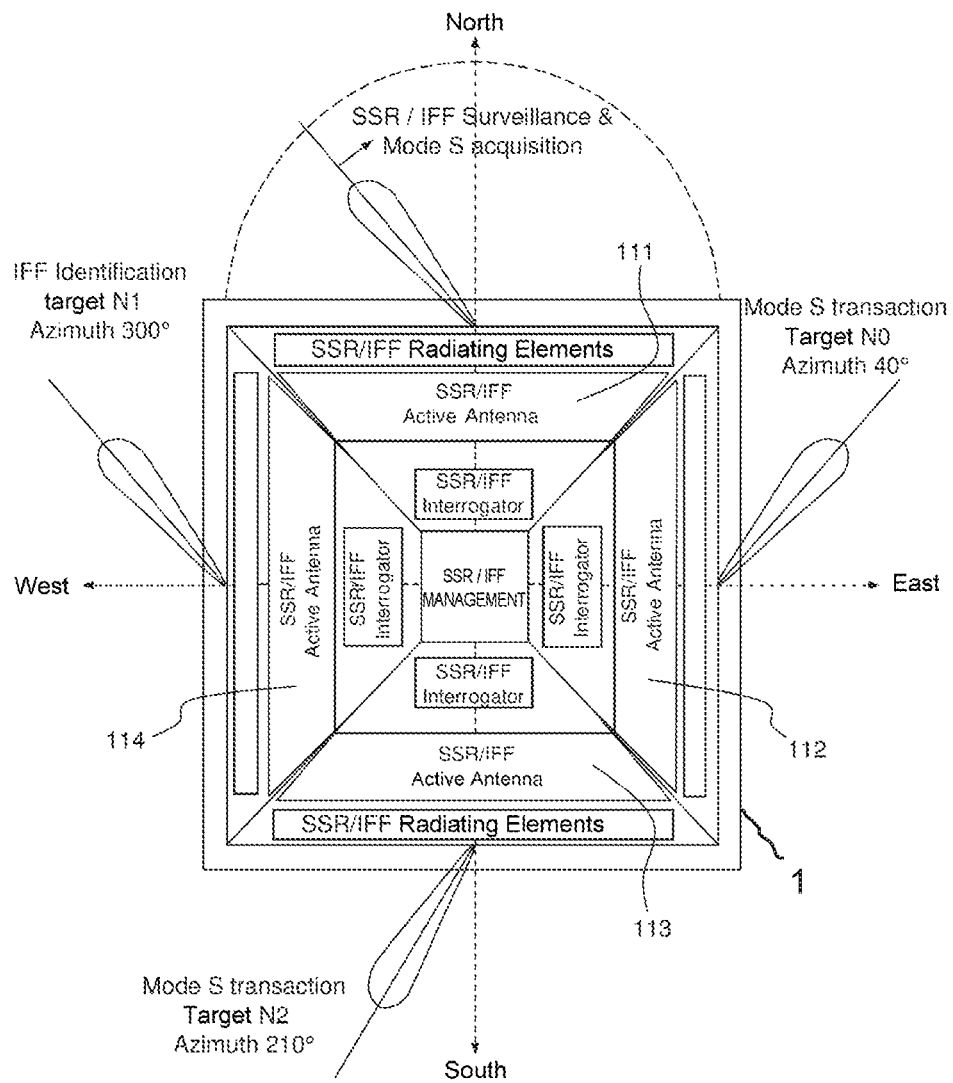
FIG. 11, an exemplary implantation of the spatio-temporal management in a radar with electronic antenna with active emission with 4 fixed panels.

FIG. 11 shows the application of this principle of spatio-temporal management in the case of a non-cylindrical fixed antenna, here it being an antenna with fixed panels which is equipped in this schematic with a single SSR/IFF interrogator per panel. In this example, whilst the upper panel ensures SSR surveillance and gathering of new mode S targets, the lateral panels and lower panel simultaneously ensure 2 mode S transactions and an IFF identification directed at other azimuths.

Figure 12:
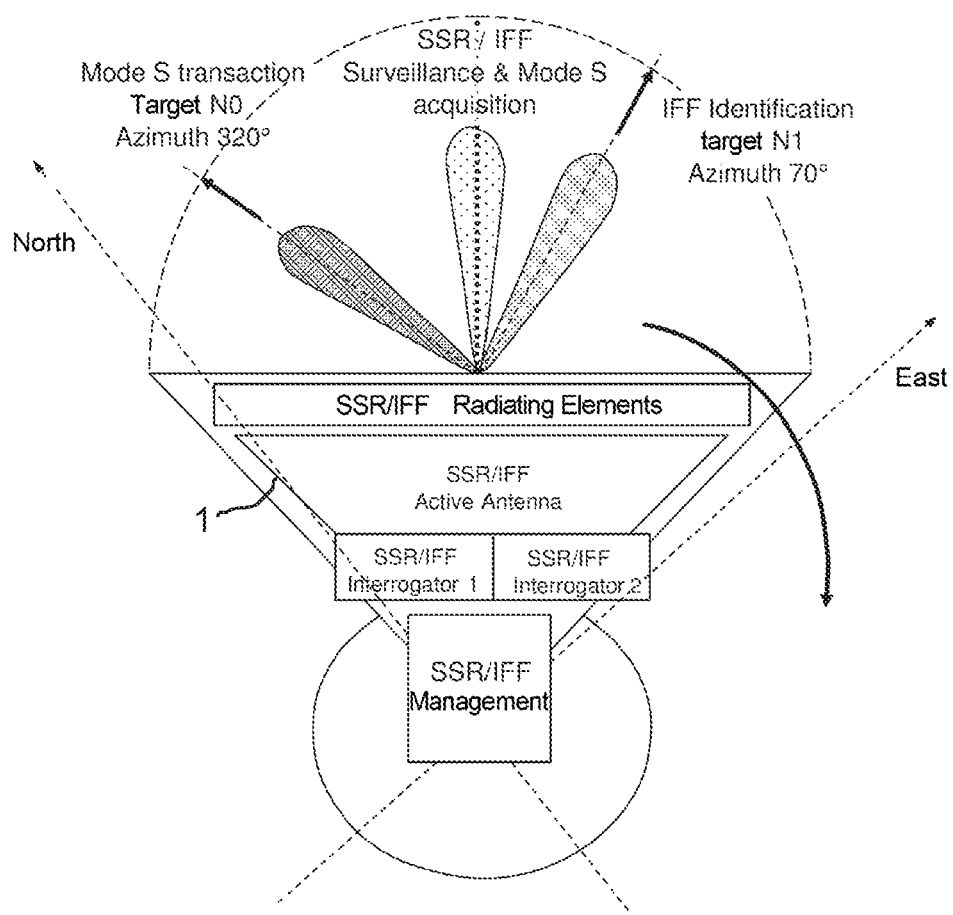
FIG. 12, an exemplary implantation of the spatio-temporal management in a radar with electronic antenna with active emission with 1 revolving panel.

FIG. 12 shows the application of this principle of spatio-temporal management in the case of a plane rotating antenna consisting of a single panel. In this example, SSR/IFF interrogator No. 1 ensures SSR surveillance and gathering of new mode S targets, whilst SSR/IFF interrogator No. 2 successively ensures a mode S transaction and an identification directed at 2 azimuths other than the reconnaissance performed by SSR/IFF interrogator No. 1.

Again, this antenna configuration, although lighter than that in FIG. 11 and therefore admittedly less efficacious, nonetheless makes it possible to limit the constraint afforded by the rotation of the antenna at one and the same time by decorrelating: the SSR surveillance and the gathering of new mode S targets, which is allocated to processor No. 1 and to the beam orthogonal to the plane of the antenna, the management of the mode S transactions and directed identification which is allocated to processor No. 2 and to the deflected beams thus offering azimuthal independence over the width of the beam deflection zone.

The principle of spatio-temporal management of the SSR/IFF interrogations in a radar according to the invention, illustrated in particular by FIG. 10, can be described in particular, in full or in part, by the characteristics hereinbelow, advantageously using the fact that at least the emission of the interrogations as the reception of the replies can be simultaneous for the various interrogators in independent azimuths:
- a first SSR/IFF interrogator 91, for example IFF No. 1, is dedicated at one and the same time to SSR or IFF surveillance and to gathering new mode S targets;
- one or more SSR/IFF interrogators 92, 93, for example SSR/IFF interrogators No. 2 and No. 3, are dedicated to mode S surveillance and to directed interrogations (DI) of IFF identification, arising from the tracks of the primary or secondary radar or any other location means, each interrogator performing the decoding of its mode S or DI replies while ensuring the temporal placement of the selective or DI interrogations so as to avoid the overlapping of its replies;

the emission of the 3 interrogators can be enabled simultaneously when the azimuthal spacing of the beams generated in reception ensures a low level (>10 dB, for example) of jamming between the interrogations, transmitted to the transponders, received by the respective sidelobes of the 3 beams;

the receptions of the 3 interrogators can be enabled simultaneously when the azimuthal spacing of the beams generated in reception ensures a low level (>10 dB, for example) of jamming between the expected replies of the radar by the respective sidelobes of the 3 beams;

SSR/IFF interrogator No. 1 for gathering new mode S targets informs the other interrogators of selective surveillance 92, 93, IFF No. 2 and No. 3, upon detection of a new target which is then managed by one of them, in particular at least one interrogator 92, 93 instructs the pointing of its reception beam in the direction of the detected target. This reactivity allows precise knowledge of the position of the target by removing the uncertainty of evolution of the target over 2 revolutions as for rotating mechanical antenna. By way of example, referring to FIG. 8, a target being detected in the emission beam 71 of interrogator No. 1, the reception beam 72 of interrogator No. 2 is then switched into the direction, during the reply, of the emission beam 71, doing so as soon as the level of the sidelobes of the new position of the beam 71 so allows, it would be possible likewise to switch the reception beam 73 of interrogator No. 3 into the direction of the emission beam 71, this depending on the respective work load of the interrogators 72 and 73;

the SSR surveillance can be speeded up, that is to say the refresh rate increased, by allocating other SSR/IFF interrogators No. 1 dedicated to SSR or IFF surveillance having independent beams, it being possible for the beams to be opposite (+180°) in the case where two interrogators are used whilst with four interrogators the beams can be in quadrature (+90°) leading to a pace of SSR surveillance respectively two to four times as fast as with a single interrogator;

in the case where the emission regime of the antenna 1 is of semi-active type, the common emission resource 94 can be allocated by priority to SSR/IFF interrogator No. 1, and then to the other interrogators, SSR/IFF interrogator No. 2 and SSR/IFF interrogator No. 3 in the example of FIG. 10, thus giving priority to the SSR surveillance since the latter emits seldom;

in the case where the emission regime of the antenna 1 is of active type, a supervisor device can be provided to enable simultaneous interrogations in azimuths that are sufficiently distinct, having regard to the beam formed, to avoid the blocking of the transponders, doing so while ensuring a lower level (>10 dB, for example) of residual of interrogations by the sidelobes.

Aside from the advantages afforded by a secondary electronic-scanning antenna (elimination in particular of motors and rotating joints), the invention advantageously allows independence of the "SSR or IFF surveillance and gathering of new mode S targets" phase and of the "mode S selective surveillance or directed IFF identification" phase. It also advantageously allows the elimination of sector overloads since the selective transactions (mode S surveillance or DI) can be maintained for the time required for the desired azimuth without penalizing the other tasks. A significant functional gain is therefore obtained while eliminating almost all the problems of sector load limit.

Hence, the service rendered by the IFF radar is operated on a temporal basis that the operator defines for each target according to the level of interest that he ascribes to it almost without azimuthal constraint.

The invention claimed is:

1. A secondary radar equipped with an electronic-scanning antenna with active or semi-active emission regime, covering space azimuthally over 360 °, wherein said radar:
    apples the principles of separation of emission pattern for each interrogation of any mode;
    of reception pattern for each reply of any mode;
    of assignment of the tasks which are specific thereto to distinct units;
    comprises one or more Secondary Surveillance Radar (SSR) or Identification, Friend or Foe (IFF) interrogators dedicated at one and the same time to SSR or IFF surveillance and to gathering new mode S targets;
    furthermore comprises one or more other SSR/IFF interrogators for selective surveillance dedicated to mode S surveillance and to directed interrogations of IFF identification;
    ensures the simultaneous emission of the interrogations of said SSR/IFF interrogators in different azimuths, said simultaneous emission being enabled when the azimuthal spacing of the beams formed in emission ensures a decoupled level of jamming at the level of the transponders of the aircraft between the interrogations received by the respective sidelobes of the beams formed in emission;
    ensures simultaneous reception of the replies to said other interrogators in different azimuths, said simultaneous reception being enabled when the azimuthal spacing of the beams formed in reception ensures a decoupled level of jamming at the level of the radar between the replies expected by the respective sidelobes of the beams formed in reception;
    instructed the interrogators to ensure amongst themselves the temporal separation of the periods either of emission or of reception when the spacing of the beams in azimuth is insufficient to guarantee detection.

2. The secondary radar as claimed in claim 1, wherein one of the interrogators dedicated at one and the same time to SSR surveillance and to gathering new mode S targets, informs said interrogators, dedicated to mode S surveillance and to directed interrogations, of the detection of a new target, said new target then being managed by said interrogators, at least one of said interrogators controlling the pointing of its emission beam and then subsequently of its reception beam in the direction of said target provided that the previously mentioned simultaneous enabling of emission and reception is acquired.

3. The secondary radar as claimed in claim 1, wherein an operator defines for each target the refresh rate that he desires for the IFF identification/surveillance whatever the azimuth of the detected target and in a manner decorrelated from reconnaissance.

4. The secondary radar as claimed in claim 1, wherein an operator defines multi-mode operation as follows:
    during reconnaissance, operation being non-selective of type
    Surveillance of aircraft of SSR aircraft
    Surveillance of military aircraft in IFF
    acquisition of new Mode S aircraft during surveillance, operation being selective/designated of type selective interrogations/replies of Mode S Surveillance selective interrogations/replies of Mode S Data Link with the same aircraft as in Mode S Surveillance directed interrogations of IFF identification (modes 4/5) on external request for a pre-detected aircraft the operator also defining:

for each target, independently, the refresh rate that he desires for the surveillance in Mode S/Mode S data link/IFF identification whatever the azimuth of the detected target and in a manner decorrelated from reconnaissance; the priorities relating to the modes selected in case of conflict on the resource for focusing the beam in azimuth in emission or in reception.

5. The secondary radar as claimed in claim 1, wherein to speed up the SSR surveillance and the IFF surveillance, said radar comprises at least one other SSR/IFF interrogator of SSR or IFF surveillance independent of said first interrogator having an associated beam pointing in a direction other than that of the beam associated with said first interrogator, opposite in the case where a single other SSR/IFF interrogator is used or in quadrature in the case where three other SSR/IFF interrogators are used.

6. The secondary radar as claimed in claim 1, wherein when the emission regime is of active type, a supervisor device is provided to enable simultaneous interrogations in azimuths that are sufficiently distinct, having regard to the beam formed, to avoid the blocking of the transponders and in that, when the emission regime is of semi-active type, the common emission resource can be allocated by priority to SSR/IFF interrogator No. 1, and then to the other interrogators.

7. The secondary radar as claimed in claim 1, wherein said antenna is cylindrical.

8. The secondary radar as claimed in claim 1, wherein said antenna consists of panels with each of which is associated at least one SSR/IFF interrogator.

9. The radar as claimed in claim 1, wherein that said antenna is fixed.

10. The radar as claimed in claim 1, wherein said antenna is a rotating antenna.

* * * * *